(12) United States Patent
Wang et al.

(10) Patent No.: US 10,495,905 B2
(45) Date of Patent: Dec. 3, 2019

(54) APPARATUS AND METHOD FOR DETECTING LIQUID CRYSTAL DIFFUSION AND APPARATUS FOR FABRICATING LIQUID CRYSTAL PANEL

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Xiangzhen Wang, Beijing (CN); Ling Hu, Beijing (CN); Wei Qin, Beijing (CN); Peng Zeng, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 211 days.

(21) Appl. No.: 15/539,127

(22) PCT Filed: Aug. 22, 2016

(86) PCT No.: PCT/CN2016/096179
§ 371 (c)(1),
(2) Date: Jun. 22, 2017

(87) PCT Pub. No.: WO2017/181567
PCT Pub. Date: Oct. 26, 2017

(65) Prior Publication Data
US 2018/0217417 A1    Aug. 2, 2018

(30) Foreign Application Priority Data

Apr. 22, 2016    (CN) .......................... 2016 1 0253255

(51) Int. Cl.
*G02F 1/13* (2006.01)
*G02F 1/1341* (2006.01)

(52) U.S. Cl.
CPC .......... *G02F 1/1309* (2013.01); *G02F 1/1341* (2013.01)

(58) Field of Classification Search
CPC ........................... G02F 1/1309; G02F 1/13441
See application file for complete search history.

(56) References Cited

U.S. PATENT DOCUMENTS

2005/0099586 A1    5/2005    Chung et al.

FOREIGN PATENT DOCUMENTS

| CN | 2583626 Y | 10/2003 |
| CN | 101444775 A | 6/2009 |

(Continued)

OTHER PUBLICATIONS

International Search Report and Written Opinion in PCT/CN2016/096179 dated Dec. 30, 2016, with English translation.

(Continued)

*Primary Examiner* — Joseph L Williams
(74) *Attorney, Agent, or Firm* — Womble Bond Dickinson (US) LLP

(57) ABSTRACT

It is disclosed an apparatus for detecting liquid crystal diffusion. The apparatus includes an image acquisition device and an image processing device. The image acquisition device acquires an image of a liquid crystal panel in an image acquiring region. The image processing device analyzes the acquired image to determine an area of an image abnormal region, and the image abnormal region is a region of the liquid crystal panel to which liquid crystal has not diffused. After curing of a frame sealant, defects about liquid crystal diffusion in the liquid crystal panel are detected, and the detected results are feedback to adjust (Continued)

parameters for injecting and diffusing liquid crystal for eliminating these defects. It is further disclosed an apparatus for fabricating a liquid crystal panel and a method for detecting liquid crystal diffusion.

20 Claims, 6 Drawing Sheets

(56) References Cited

FOREIGN PATENT DOCUMENTS

| CN | 202939383 U | 5/2013 |
|---|---|---|
| CN | 103383499 A | 11/2013 |
| CN | 103389601 A | 11/2013 |
| CN | 103454790 A | 12/2013 |
| CN | 105137670 A | 12/2015 |
| CN | 105739137 A | 7/2016 |
| JP | H 10333162 A | 12/1998 |
| JP | 2000275596 A | 10/2000 |
| JP | 2005-128519 A | 5/2005 |
| JP | 2007-156103 A | 6/2007 |
| KR | 10-2002-0042927 A | 6/2002 |
| KR | 20020088219 A | 11/2002 |
| KR | 20140000445 A | 1/2014 |

OTHER PUBLICATIONS

Zhao et al., "Study on the Influence Factors of Sealant Collapse in ODF Process", Advanced Display, 2012, vol. 23, No. 7, pp. 18-21 (English Abstract Submitted).

Office Action received for Chinese Patent Application No. 201610253255.8, dated Jun. 20, 2018, 26 pages. (15 pages of English Translation and 11 pages of Office Action).

Liu et al., "Diffusion study of liquid crystal in TFT-LCD", Chinese Journal of Liquid Crystals and Displays, 2014, vol. 29, No. 2, pp. 214-217 (English Abstract Submitted).

APPARATUS AND METHOD FOR DETECTING LIQUID CRYSTAL DIFFUSION AND APPARATUS FOR FABRICATING LIQUID CRYSTAL PANEL

RELATED APPLICATIONS

The present application is the U.S. national phase entry of PCT/CN2016/096179, with an international filing date of Aug. 22, 2016, which claims the benefit of Chinese Patent Application No. 201610253255.8, filed on Apr. 22, 2016, the entire disclosures of which are incorporated herein by reference.

TECHNICAL FIELD

The present disclosure relates to the field of display technology, and particularly to an apparatus and a method for detecting liquid crystal diffusion and an apparatus for fabricating a liquid crystal panel.

BACKGROUND

Currently, a liquid crystal display has become a dominant product in the display market. A liquid crystal panel is a primary component of the liquid crystal display, and comprises an array substrate, a color film substrate, a liquid crystal layer or the like. During assembling the liquid crystal panel, a frame sealant is coated in a periphery of a display region of the array substrate, liquid crystal is injected in a space surrounded by the frame sealant, and the color film substrate is assembled with the array substrate. The frame sealant is then cured to form the liquid crystal panel (also referred to as a liquid crystal cell).

During the assembling process, liquid crystal may not diffuse to an edge of a space surrounded by the frame sealant, especially four corners of the space, so that a phenomenon in which the space is not filled by liquid crystal (abbreviated as Not Fill hereinafter) occurs. When Not Fill occurs in the periphery of the liquid crystal panel, liquid crystal is distributed in the liquid crystal panel non-uniformly, which affects the yield and display effect of the liquid crystal panel.

During the assembling process, liquid crystal is squeezed to diffuse rapidly in the space surrounded by the frame sealant. In case the frame sealant which acts to seal the liquid crystal has not been cured completely, it is possibly impacted by liquid crystal. The color film substrate and the array substrate are squeezed to each other due to the vacuum environment therebetween, so that the impact of liquid crystal against the frame sealant is exacerbated. The phenomenon that the frame sealant is impacted by liquid crystal is called liquid crystal puncture. This leads to problems, e.g., deforming or cracking of the frame sealant, decrease in adhesive strength of the frame sealant, liquid crystal being contaminated by the frame sealant. These problems may also affect the yield and display quality of the liquid crystal panel.

SUMMARY

Embodiments of the present disclosure intend to provide an apparatus and a method for detecting liquid crystal diffusion and an apparatus for fabricating a liquid crystal panel, in which defects about liquid crystal diffusion in the liquid crystal panel are detected after the frame sealant is cured, and the detected results are feedback to adjust parameters for injecting and diffusing liquid crystal to eliminate the defects.

An embodiment of the present disclosure provides an apparatus for detecting liquid crystal diffusion, comprising an image acquisition device, which is configured to acquire an image of a liquid crystal panel in an image acquiring region of the liquid crystal panel; and an image processing device, which is configured to analyze the acquired image to determine an area of an image abnormal region, wherein the image abnormal region is a region of the liquid crystal panel to which liquid crystal has not diffused.

In the apparatus for detecting liquid crystal diffusion of this embodiment, after assembling process and frame sealant curing, the image processing device analyzes an image of the liquid crystal panel acquired by the image acquisition device, determines an area of an image abnormal region in the image, and thus determines a region in the liquid crystal panel to which liquid crystal has not diffused. Analysis results from the image processing device are feedback to adjust parameters for injecting and diffusing liquid crystal to eliminate defects about liquid crystal diffusion.

In an embodiment of the present disclosure, the apparatus for detecting liquid crystal diffusion further comprises an injection control device, which is configured to, as a response to the area of the image abnormal region being larger than a predefined area, adjust a liquid crystal injection device to decrease the area of the image abnormal region.

In the apparatus for detecting liquid crystal diffusion of this embodiment, in case the area of the image abnormal region is larger than a predefined area, it is determined that the phenomenon of Not Fill occurs. In this case, the injection control device adjusts the liquid crystal injection device to decrease the area of the image abnormal region, so as to alleviate or eliminate the phenomenon of Not Fill, and to improve the yield and display effect of the liquid crystal panel. The apparatus for detecting liquid crystal diffusion of this embodiment, when applied to practical production, facilitates improving production efficiency, improving the quality of liquid crystal panel, and decreasing manual labor.

In an embodiment of the present disclosure, the image acquiring region is arranged to surround a display region of the liquid crystal panel, and the image acquiring region comprises at least a corner of the display region. In an embodiment, the image acquiring region comprises a middle point of at least a side of the display region. In an embodiment, the image acquiring region comprises four corners and middle points of four sides of the display region.

In the apparatus for detecting liquid crystal diffusion of this embodiment, the image acquiring region surrounds the display region of the liquid crystal panel, so that the image acquired by the image acquisition device at the image acquiring region comprises an edge of the display region of the liquid crystal panel and a region near the frame sealant, thus providing information about Not Fill and/or liquid crystal puncture.

In an embodiment of the present disclosure, the image acquisition device comprises one or more groups of moveable scanning lenses, wherein each moveable scanning lens in each group corresponds to each image acquiring region, respectively.

In the apparatus for detecting liquid crystal diffusion of this embodiment, the image acquisition device only comprises one moveable scanning lens, and image acquisition of the liquid crystal panel is performed by the moveable scanning lens at one or more image acquiring region. In an embodiment, the image acquisition device comprises a plurality of moveable scanning lenses, each moveable scanning lens corresponds to each image acquiring region of the liquid crystal panel, respectively, and image acquisition at a plurality of image acquiring regions of one liquid crystal panel is performed simultaneously by these moveable scanning lenses. In an embodiment, the image acquisition device comprises groups of moveable scanning lenses, each group of moveable scanning lenses comprise a plurality of moveable scanning lenses, each moveable scanning lens corresponds to each image acquiring region of the liquid crystal panel, respectively, and image acquisition at a plurality of image acquiring regions of a plurality of liquid crystal panels is performed simultaneously by these groups of moveable scanning lenses. The apparatus for detecting liquid crystal diffusion of this embodiment facilitates simultaneously acquiring groups of images, thus decreasing time for image acquisition, improving the base number for sampling and providing correct detected results. The apparatus for detecting liquid crystal diffusion of this embodiment further facilitates automated detection. In an exemplary embodiment, the location of the moveable scanning lens is set and controlled by a recipe of the apparatus.

In an embodiment of the present disclosure, the area of an image abnormal region is an area of a grayscale abnormal region in the acquired image.

In the apparatus for detecting liquid crystal diffusion of this embodiment, a region to which liquid crystal has diffused is determined in the acquired image according to a location with respect to the center of liquid crystal panel. The image acquired in the image acquiring region not only comprises the display region of the liquid crystal panel, but also comprises the region near the frame sealant. For example, in the acquired image, as compared with a region distant from the center of liquid crystal panel, a region near the center of liquid crystal panel is generally more easily filled by liquid crystal. In case the region distant from the center of liquid crystal panel shows a grayscale different from that of the region near the center of liquid crystal panel, it is determined that grayscale abnormal is present and that the region distant from the center of liquid crystal panel has not been filled by liquid crystal. Generally, a microscopic device such as microscope is used to acquire a grayscale microscopic image of liquid crystal panel, so that the apparatus for detecting liquid crystal diffusion is easy to implement.

In an embodiment of the present disclosure, the predefined area is an area of 5 pixel units of the liquid crystal panel.

In the apparatus for detecting liquid crystal diffusion of this embodiment, in case an area of a grayscale abnormal region in the acquired image is larger than for example a predefined area of 5 pixels, it is determined that the phenomenon of Not Fill occurs. As used herein, the term "a pixel unit" means a pixel in the liquid crystal panel. In an embodiment, the predefined area is manually adjusted according to actual production conditions, so that the apparatus for detecting liquid crystal diffusion is more flexible.

In an embodiment of the present disclosure, the injection control device is configured to adjust the liquid crystal injection device to decrease a distance between a liquid crystal injection point which is closest to a corner of a frame sealant and one or two sides of the corner.

In the apparatus for detecting liquid crystal diffusion of this embodiment, in case it is determined that the phenomenon of Not Fill occurs, the apparatus for detecting liquid crystal diffusion adjusts the liquid crystal injection device by means of the injection control device. For example, in case the liquid crystal injection device is a liquid crystal dropping device (e.g., an One drop fill (ODF) device), a liquid crystal pattern (LC pattern) dropped by the liquid crystal dropping device is adjusted. For example, a dropping point of the liquid crystal dropping device which is closest to a corner of the frame sealant is brought close to the corner, so that liquid crystal droplets which are dropped at this dropping point is close to this corner. This decreases a distance between the liquid crystal droplet and the corner, thus decreasing or eliminating the phenomenon of Not Fill. Similarly, in case the liquid crystal injection device is an inkjet device, an inkjet point of the inkjet device which is closest to the corner of the frame sealant is brought close to the corner. This decreases a distance between the inkjet point and the corner, thus decreasing or eliminating the phenomenon of Not Fill.

In an embodiment of the present disclosure, the image acquisition device is further provided with a rotatable polarizing component.

In the apparatus for detecting liquid crystal diffusion of this embodiment, the rotatable polarizing component is provided, which is rotated for observing and acquiring an image about liquid crystal puncture. In an embodiment, the polarizing component is a polarizer plate. For example, the polarizer plate is detachably connected with the image acquisition device.

In an embodiment of the present disclosure, the image processing device is further configured to analyze the acquired image to determine a puncture distance of liquid crystal; and the injection control device is further configured to, as a response to the puncture distance being larger than the predefined distance, decrease a liquid crystal diffusion time T to decrease the puncture distance.

In the apparatus for detecting liquid crystal diffusion of this embodiment, the image processing device analyzes the acquired image to determine whether the phenomenon of liquid crystal puncture occurs. For example, by comparing different regions of an image which is acquired in a same image acquiring region, or by comparing a same region of multiple images which are acquired in different image acquiring regions, a puncture distance of liquid crystal is determined. In case the puncture distance is larger than predefined distance, the injection control device decreases a liquid crystal diffusion time T to decrease the puncture distance. In this case, the injection control device adjusts liquid crystal diffusion time or liquid crystal pattern, so as to alleviate or eliminate the phenomenon of liquid crystal puncture, and to improve the yield and display effect of the liquid crystal panel. The apparatus for detecting liquid crystal diffusion of this embodiment, when applied to practical production, facilitates improving production efficiency, improving the quality of liquid crystal panel, and decreasing manual labor. It is noted that adjusting the distance between the liquid crystal injection point in the liquid crystal pattern which is closest to a corner of a frame sealant and the corner also facilitates decreasing puncture distance, although the effect of such adjusting is much weaker than the effect of adjusting liquid crystal diffusion time T.

In an embodiment of the present disclosure, the predefined distance is ⅓ of a width of a frame sealant.

In the apparatus for detecting liquid crystal diffusion of this embodiment, in case the determined puncture distance is larger than for example ⅓ of the width of the frame sealant, it is determined that the phenomenon of liquid crystal puncture occurs. In an embodiment, the predefined distance is adjusted manually according to actual production conditions, so that the apparatus for detecting liquid crystal diffusion is more flexible.

In an embodiment of the present disclosure, the injection control device is further configured to, as a response to the puncture distance being larger than the predefined distance, decrease the liquid crystal diffusion time $T=T_1+T_2$, wherein $T_1$ is a duration of staying in vacuum state after an assembling process, and wherein $T_2$ is a duration from an end of the vacuum state to the start of frame sealant curing.

In the apparatus for detecting liquid crystal diffusion of this embodiment, in case puncture distance is larger than predefined distance, the injection control device decreases the liquid crystal diffusion time $T=T_1+T_2$, wherein $T_1$ is a duration of staying in vacuum state after an assembling process, and wherein $T_2$ is a duration from an end of the vacuum state to the start of frame sealant curing. Generally, the liquid crystal diffusion process is primarily divided into stage (i) which is from liquid crystal being dropped to the assembling process, stage (ii) which is during the assembling process, and stage (iii) which is from the end of the assembling process to the start of frame sealant curing process. It is verified by practical production that liquid crystal puncture is primarily affected by the above mentioned stage (iii). Therefore, in this embodiment, the above mentioned stage (iii) is mainly considered. The assembling process is generally conducted in vacuum, so that the above diffusion time $T=T_1+T_2$ also indicates a time delay of the frame sealant curing process with respect to the assembling process. In this regard, the diffusion time $T=T_1+T_2$ is also called a process delay time.

In an embodiment of the present disclosure, the injection control device is configured to decrease the liquid crystal diffusion time T by $\Delta T=3\mu(\Delta d)/\sigma b \cos \varphi$, wherein $\mu$ is a viscosity coefficient of liquid crystal, $\Delta d$ is the puncture distance of liquid crystal, $\sigma$ is a surface tension coefficient of liquid crystal, b is a distance between two substrates of the liquid crystal panel, and $\varphi$ is a wetting angle of liquid crystal.

In the apparatus for detecting liquid crystal diffusion of this embodiment, the above mentioned empirical formula for liquid crystal diffusion time is adopted, and this empirical formula is based on the law of viscosity for fluid and the Washburn model for fluid flow. In the apparatus for detecting liquid crystal diffusion of this embodiment, in case it is determined that the phenomenon of liquid crystal puncture occurs, the liquid crystal diffusion time is quantitatively decreased according to the puncture distance.

In an embodiment of the present disclosure, the apparatus for detecting liquid crystal diffusion further comprises: a first light source, which is arranged at a same side of the liquid crystal panel as the image acquisition device, and configured to provide oblique illumination for the image acquisition device in the image acquiring region; and a second light source, which is arranged at a side of the liquid crystal panel opposite to the image acquisition device, and configured to provide back illumination for the image acquisition device in the image acquiring region.

In the apparatus for detecting liquid crystal diffusion of this embodiment, the auxiliary first and second light source are applied to provide appropriate lighting for detecting Not Fill and liquid crystal puncture.

An embodiment of the present disclosure provides an apparatus for fabricating a liquid crystal panel, which comprises a liquid crystal injection device and the above described apparatus for detecting liquid crystal diffusion.

The apparatus for fabricating a liquid crystal panel of this embodiment has same or similar beneficial effects as the above described apparatus for detecting liquid crystal diffusion, which are not repeated for simplicity.

An embodiment of the present disclosure provides a method for detecting liquid crystal diffusion, comprising: acquiring an image of a liquid crystal panel in an image acquiring region of the liquid crystal panel; and analyzing the acquired image to determine an area of an image abnormal region, wherein the image abnormal region is a region of the liquid crystal panel to which liquid crystal has not diffused. The method further comprises adjusting a liquid crystal injection device to decrease the area of the image abnormal region, as a response to the area of the image abnormal region being larger than a predefined area.

In an embodiment of the present disclosure, the step of adjusting the liquid crystal injection device to decrease the area of the image abnormal region comprises: adjusting the liquid crystal injection device to decrease a distance between a liquid crystal injection point which is closest to a corner of a frame sealant and one or two sides of the corner.

In an embodiment of the present disclosure, the method further comprises: acquiring an image of a liquid crystal panel in the image acquiring region of the liquid crystal panel by means of a polarizing component; analyzing the acquired image to determine a puncture distance of liquid crystal; and decreasing a liquid crystal diffusion time T to decrease the puncture distance, as a response to the puncture distance being larger than a predefined distance.

In an embodiment of the present disclosure, decreasing the liquid crystal diffusion time T to decrease the puncture distance comprises: decreasing the liquid crystal diffusion time $T=T_1+T_2$, wherein $T_1$ is a duration of staying in vacuum state after an assembling process, and wherein $T_2$ is a duration from an end of the vacuum state to the start of frame sealant curing.

In an embodiment of the present disclosure, decreasing the liquid crystal diffusion time T to decrease the puncture distance comprises: decreasing the liquid crystal diffusion time T by $\Delta T=3\mu(\Delta d)/\sigma b \cos \varphi$, wherein $\mu$ is a viscosity coefficient of liquid crystal, $\Delta d$ is the puncture distance of liquid crystal, $\sigma$ is a surface tension coefficient of liquid crystal, b is a distance between two substrates of the liquid crystal panel, and $\varphi$ is a wetting angle of liquid crystal.

The method for detecting liquid crystal diffusion of this embodiment has same or similar beneficial effects as the above described apparatus for detecting liquid crystal diffusion, which are not repeated for simplicity.

Embodiments of the present disclosure disclose an apparatus for detecting liquid crystal diffusion, which comprises an image acquisition device and an image processing device. The image acquisition device acquires an image of a liquid crystal panel in an image acquiring region of the liquid crystal panel. The image processing device analyzes the acquired image to determine an area of an image abnormal region, and the image abnormal region is a region of the liquid crystal panel to which liquid crystal has not diffused. Embodiments of the present disclosure further disclose an apparatus for fabricating a liquid crystal panel which comprising the above mentioned apparatus for detecting liquid crystal diffusion, as well as a method for detecting liquid crystal diffusion. After curing of a frame sealant, defects about liquid crystal diffusion in the liquid crystal panel are detected, and the detected results are feedback to adjust parameters for injecting and diffusing liquid crystal for eliminating these defects.

It will be understood that the general description and the following detailed description are only exemplary and illustrative, and do not intend to limit the present disclosure in any manner.

BRIEF DESCRIPTION OF THE DRAWINGS

In order to explain the technical solutions in embodiments of the present disclosure more clearly, the drawings to be used in the description of the embodiments will be introduced briefly in the following. Apparently, the drawings described below are only some embodiments of the present disclosure.

Figure 1:
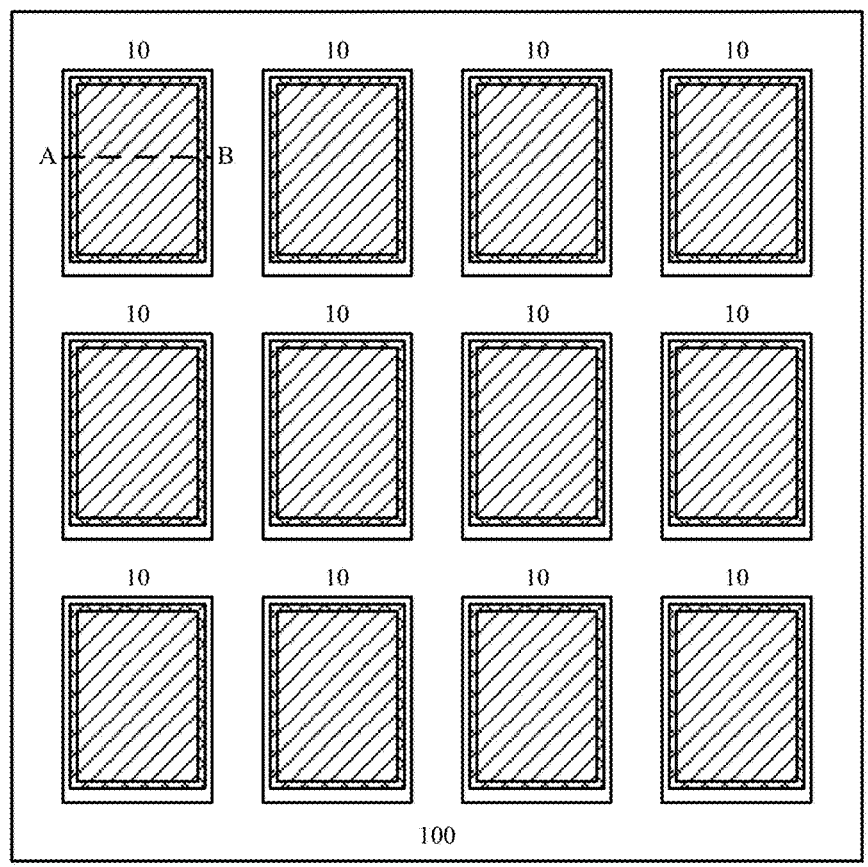
FIG. 1 is a schematic view for illustrating a liquid crystal panel after assembling and prior to cutting.

The above mentioned drawings have shown explicit embodiments of the present disclosure, and more detailed description of these embodiments will be presented hereinafter. These drawings and description do not intend to limit the scope of the concept of the present disclosure, but to explain ideas of the present disclosure for a person with ordinary skill in the art by referring to specific embodiments.

DETAILED DESCRIPTION OF EMBODIMENTS

Specific embodiments of the present disclosure will be further described hereinafter with reference to the drawings and embodiments. The following embodiments are only used for explaining more clearly the technical solution of the present disclosure rather than limiting the protection scope of the present disclosure.

Reference numerals: 10 liquid crystal panel; 100 first substrate; 102 display region; 104 peripheral region; 110, 115 frame sealant; 120, 125 liquid crystal droplet; 130, 135 liquid crystal layer; 200 second substrate; 300 liquid crystal injection device; 400 injection control device; 500 support component; 600, 650 image acquisition device; 655 polarizing component; 700 image processing device; TP, 11, 12, 13, 14, 21, 22, 23, 24 image acquiring region; D1, D2 distance between liquid crystal injection point and a side of liquid crystal panel; 810 first light source; 820 second light source; 1000 apparatus for fabricating a liquid crystal panel; Δd liquid crystal puncture distance; w width of frame sealant.

Unless otherwise defined, the technical or scientific terms used in the present invention shall have the general meanings understandable for those ordinarily skilled in the field of the present disclosure. The wordings such as "first", "second" or similar used in the description and claims of the present invention shall not represent any order, number or importance, but are used for distinguishing different elements. Similarly, the words such as "an", "a" or similar shall not represent limitation of numbers, but mean existence of at least one. The words "comprise", "include" or similar indicate an element or article preceding these words shall contain elements or articles listed behind these words and equivalents thereto, and do not exclude the presence of elements or articles other than those listed. The phrases "upper", "lower", "left", "right" and etc. shall be used only to represent relative positions, wherein, when the absolute position of the described object is changed, the relative positions may be changed accordingly.

Figure 2A:
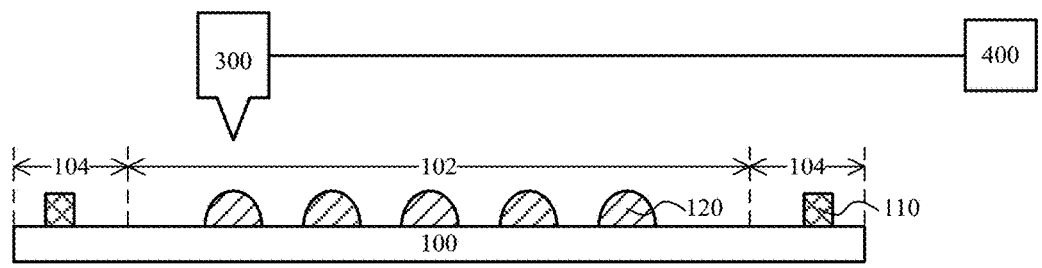
FIG. 2A and FIG. 2B are schematic cross-sectional views for illustrating a liquid crystal panel.
Figure 2B:
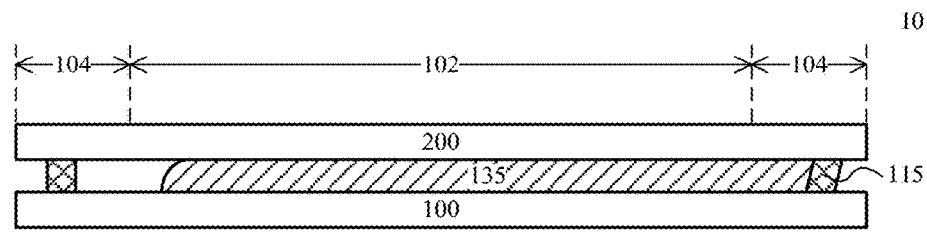

Reference is made to FIG. 1, FIG. 2A and FIG. 2B. FIG. 1 is a schematic view for a liquid crystal panel after assembling and prior to cutting, and FIGS. 2A and 2B are schematic cross-sectional views for the liquid crystal panel. FIGS. 2A and 2B are cross-sectional views along a line A-B in FIG. 1.

As shown, a first substrate 100 is firstly provided, which comprises a display region 102 and a peripheral region 104 surrounding the display region 102. Then, a frame sealant 110 is applied on the peripheral region 104 of the first substrate 100. As shown in FIG. 2A, a liquid crystal dropping (ODF) process is performed. Liquid crystal is dropped from a liquid crystal injection device 300 into the display region 102 of the first substrate 100, so as to form liquid crystal droplets 120 which are arranged in a matrix. Then, as shown in FIG. 2B, a second substrate 200 is provided, and the second substrate 200 and the first substrate 100 are assembled by means of the frame sealant 110. Then, the frame sealant 110 is cured by a method such as ultraviolet (UV) curing, and the assembling process is completed. The resulting liquid crystal panel 10 is shown in FIG. 2B and FIG. 1.

Generally, the first substrate 100 and the second substrate 200 is made from a transparent material like glass. The first substrate 100 is an array substrate, and the second substrate 200 is a color film substrate. Alternatively, the first substrate 100 is a color film substrate, and the second substrate 200 is an array substrate.

For clarity, the second substrate 200 is not shown in FIG. 1. As shown, the first substrate 100 comprises a plurality of liquid crystal panels 10 which are arranged in a matrix. The singular liquid crystal panel 10 after cutting is shown in FIG. 2B.

After the above mentioned processes, the liquid crystal droplets 120 diffuse and combine mutually, so as to form a liquid crystal layer 135 between the first substrate 100 and the second substrate 200. As shown in FIG. 2B, the liquid crystal layer 135 has not completely filled the display region 102 at the left side, and thus the phenomenon of Not Fill occurs. During operation of the liquid crystal panel 10, a display defect appears in this region. In addition, as shown in FIG. 2B, the liquid crystal layer 135 impacts a frame sealant 115 which has not cured at the right side, so that the frame sealant 115 is subject to deforming or cracking, and the phenomenon of liquid crystal puncture occurs. During use of the liquid crystal panel 10, the adhesive strength of the frame sealant 115 in this region decreases, so that liquid crystal is contaminated by the frame sealant 115, and the yield and display quality of the liquid crystal panel 10 decreases.

It has been recognized by inventors of the present application that diffusion of liquid crystal plays an important role in quality control of the liquid crystal panel. In one aspect, excessive diffusion liquid crystal may lead to liquid crystal puncture, and severe liquid crystal puncture may cause defects like peripheral Mura, and Line Zara during polishing process. In another aspect, insufficient diffusion of liquid crystal may lead to the defect of Not Fill.

It has been further recognized by inventors of the present application that, by providing an apparatus and method for detecting Not Fill and/or puncture, which provides data about Not Fill and/or liquid crystal puncture, so that the data is used to adjust the upstream process to alleviate or eliminate Not Fill and/or liquid crystal puncture. This helps to avoid frequent occurrence of defects in batches, improve yield of the liquid crystal panel, and decrease production cost.

Embodiments of the present disclosure provide an apparatus for detecting liquid crystal diffusion, comprising an image acquisition device, which is configured to acquire an image of a liquid crystal panel in an image acquiring region of the liquid crystal panel; and an image processing device, which is configured to analyze the acquired image to determine an area of an image abnormal region, wherein the image abnormal region is a region of the liquid crystal panel to which liquid crystal has not diffused. In the apparatus for detecting liquid crystal diffusion, after curing of a frame sealant, defects about liquid crystal diffusion in the liquid crystal panel are detected, and the detected results are feedback to adjust parameters for injecting and diffusing liquid crystal for eliminating these defects.

Implementations of the apparatus for detecting liquid crystal diffusion, the apparatus for fabricating a liquid crystal panel and the method for detecting liquid crystal diffusion according to embodiments of the present disclosure will be described hereinafter with reference to the accompanying drawings.

Figure 3:
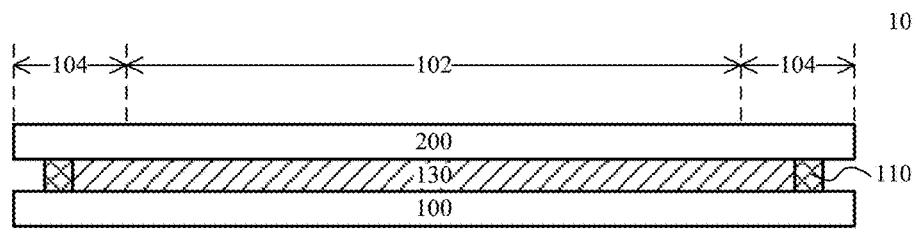
FIG. 3 is a schematic cross-sectional view for illustrating a liquid crystal panel in an embodiment of the present disclosure.

FIG. 3 schematically illustrates a cross-sectional view of a liquid crystal panel in an embodiment of the present disclosure. Similar to FIG. 2B, the cross-sectional view of FIG. 3 is also cut along the line A-B in FIG. 1. FIG. 3 shows an ideal distribution state of a liquid crystal layer 130 in which the liquid crystal panel 10 has been subject to the frame sealant curing process. As shown, after the frame sealant curing process, the liquid crystal layer 130 are continuously distributed between the first substrate 100 and the second substrate 200 and just right completely fills the space enclosed by the frame sealant 110. This means that the phenomenon of Not Fill does not occur. In addition, the frame sealant 110 is regular and complete without deforming or cracking, which means the phenomenon of liquid crystal puncture does not occur.

It will be appreciated by the person with ordinary skill in the art that FIG. 3 only shows an ideal distribution state of the liquid crystal layer 130. In practical applications, it is only required the liquid crystal layer 130 to have a distribution close to this ideal distribution state. For example, in an exemplary embodiment, the liquid crystal layer 130 is continuously distributed between the first substrate 100 and the second substrate 200, and an edge of the liquid crystal layer 130 at least reaches an edge of the display region 102. In this embodiment, the liquid crystal layer 130 does not necessarily contact the frame sealant 110, and distances between the edges of the liquid crystal layer 130 and the frame sealant 110 are equal or unequal.

Figure 4:
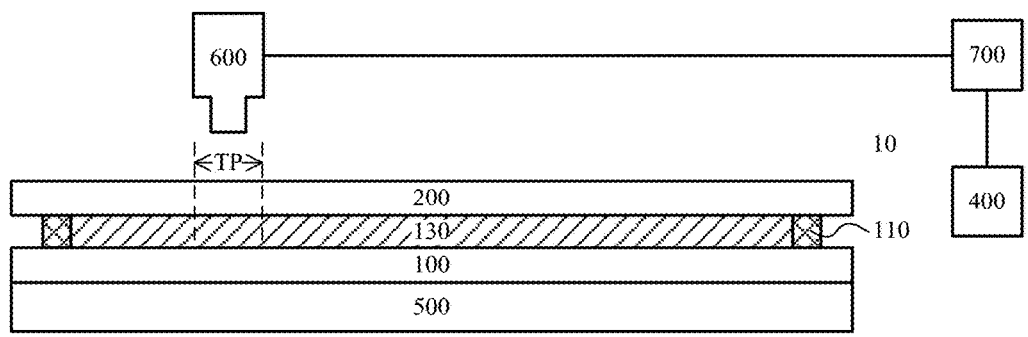
FIG. 4 is a schematic view for illustrating an apparatus for detecting liquid crystal diffusion in an embodiment of the present disclosure.

FIG. 4 schematically illustrates a structural diagram of an apparatus for detecting liquid crystal diffusion in an embodiment of the present disclosure. As shown, the apparatus for detecting liquid crystal diffusion comprises an image acquisition device 600. The liquid crystal panel 10 is supported by a support component 500. The image acquisition device 600 acquires an image of the liquid crystal panel 10 in an image acquiring region TP of the liquid crystal panel 10. The apparatus for detecting liquid crystal diffusion further comprises an image processing device 700. The image processing device 700 analyzes the acquired image, so as to determine an area of an abnormal region in the image. The image abnormal region indicates a region of the liquid crystal panel 10 to which liquid crystal has not diffused. The apparatus for detecting liquid crystal diffusion further comprises an injection control device 400. In case the area of the image abnormal region is larger than a predefined area, the injection control device 400 adjusts the liquid crystal injection device 300 (see FIG. 2A) to decrease an area of an image abnormal region. In case the area of the image abnormal region is larger than the predefined area, it is determined that the phenomenon of Not Fill occurs. In this case, the injection control device 400 adjusts the liquid crystal injection device 300 to decrease the area of the image abnormal region, so as to alleviate or eliminate the phenomenon of Not Fill, and improve the yield and display effect of the liquid crystal panel 10.

Figure 5A:
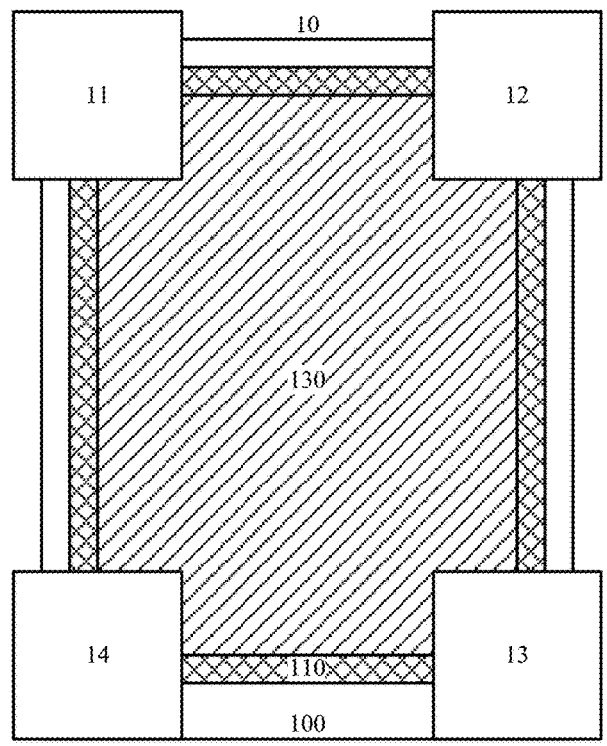
FIG. 5A, FIG. 5B and FIG. 5C are schematic views for illustrating an image acquiring region in an embodiment of the present disclosure.
Figure 5B:
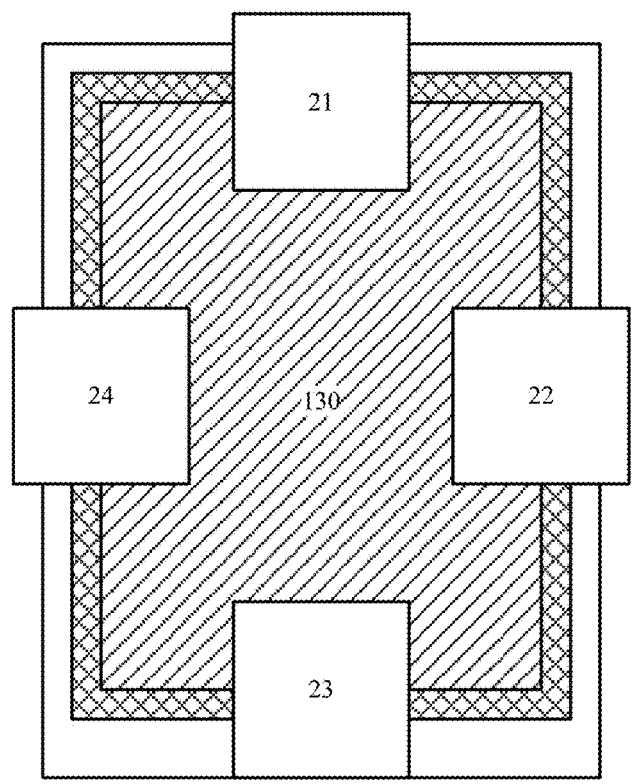
Figure 5C:
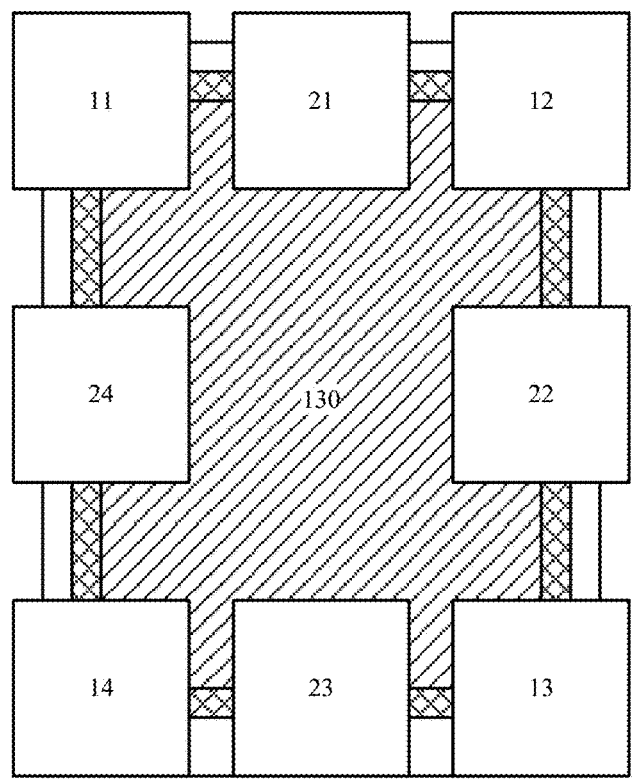

FIG. 5A, FIG. 5B and FIG. 5C schematically illustrate a distribution of image acquiring regions TP in the liquid crystal panel 10 in an embodiment of the present disclosure.

Generally, image acquiring regions TP are arranged to surround the display region 102 of the liquid crystal panel 10, so that images acquired by the image acquisition device 600 in image acquiring regions TP comprise an edge of the display region 101 of the liquid crystal panel 10 and a region near the frame sealant 110, thus providing information about liquid crystal diffusion in the liquid crystal panel 10, e.g., information about Not Fill and/or liquid crystal puncture.

In an exemplary embodiment, image acquiring regions TP comprise at least a corner of the display region 102 of the liquid crystal panel 10. As shown in FIG. 5A, image acquiring regions TP comprise at least one of image acquiring regions 11, 12, 13, 14. Generally, the phenomenon of Not Fill easily occurs at four corners of the liquid crystal panel 10. Image acquiring regions 11, 12, 13, 14 shown in FIG. 5A facilitate providing information about Not Fill.

In an exemplary embodiment, image acquiring regions TP comprise a point on at least a side of the display region 102 of the liquid crystal panel 10, e.g., a middle point of the side. As shown in FIG. 5B, image acquiring regions TP comprise at least one of the image acquiring regions 21, 22, 23, 24. Generally, the phenomenon of liquid crystal puncture easily occurs at four sides of the liquid crystal panel 10. The image acquiring regions 21, 22, 23, 24 shown in FIG. 5B facilitate providing information about liquid crystal puncture.

In an exemplary embodiment, image acquiring regions TP comprise at least a corner and a middle point of at least a side of the display region 102 of the liquid crystal panel 10, e.g., at least one of image acquiring regions 11, 12, 13, 14 and at least one of image acquiring regions 21, 22, 23, 24, so as to simultaneously provide information about Not Fill and liquid crystal puncture. In an example, image acquiring regions TP comprise four corners and middle points of four sides of the display region 102 of the liquid crystal panel 10, e.g., eight image acquiring regions 11, 12, 13, 14, 21, 22, 23, 24 shown in FIG. 5C.

In an exemplary embodiment, the image acquisition device 600 shown in FIG. 4 only comprises one moveable scanning lens 600, and the moveable scanning lens performs image acquisition on the liquid crystal panel 10 at one or more image acquiring regions TP.

In an exemplary embodiment, the image acquisition device 600 shown in FIG. 4 comprises a group of moveable scanning lenses 600, each moveable scanning lens corresponds to each image acquiring region TP of the liquid crystal panel 10 in term of location, and these moveable scanning lenses 600 performs image acquisition on one liquid crystal panel 10 at the plurality of image acquiring regions TP simultaneously. In an example, the image acquisition device 600 comprises groups of moveable scanning lenses 600, so as to simultaneously perform image acquisition on a plurality of liquid crystal panels 10 at the plurality of image acquiring regions TP. For example, in case each group of moveable scanning lenses comprise 8 moveable scanning lens, which correspond to image acquiring regions 11, 12, 13, 14, 21, 22, 23, 24 shown in FIG. 5C, respectively. In this way, the image acquisition device 600 facilitates simultaneously performing image acquisition on one or more liquid crystal panels at eight image acquiring regions. This decreases time for image acquisition, improves the base number for sampling to provide correct detected results, and thus facilitates realization of automated detection.

In an exemplary embodiment, the above mentioned moveable scanning lens 600 is implemented as a microscopic device such as microscope. The moveable scanning lens 600 acquires a microscopic image of the liquid crystal panel 10.

Figure 6:
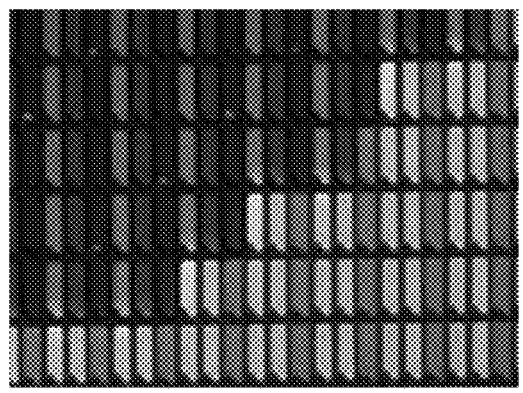
FIG. 6 is an image of a liquid crystal panel acquired by an image acquisition device in an embodiment of the present disclosure.

FIG. 6 schematically illustrates a micrograph of a liquid crystal panel acquired by an image acquisition device. The micrograph is an image of the liquid crystal panel 10 which is acquired by the image acquisition device 600 at the image acquiring region 11 shown in FIGS. 5A, 5B and 5C. The region which has a rectangular shape as a whole in the micrograph corresponds to a pixel unit of the liquid crystal panel 10. As shown, the lower right part of the micrograph is relatively bright, i.e., has a relatively high grayscale value. In contrast, since liquid crystal has not diffused to the upper left part of the image acquiring region, the upper left part of the micrograph is relatively dark, i.e., has a relatively low grayscale value. In this example, the upper left part is deemed as an image abnormal region, i.e., a region with a grayscale value different from that of the region which has been filled with liquid crystal. In case the area of the image abnormal region is larger than the predefined area, it is determined that the phenomenon of Not Fill occurs. In this case, the injection control device 400 adjusts the liquid crystal injection device 300 to decrease the area of an image abnormal region. It will be understood that the predefined area is the area of 5, 10, or 20 pixel units, and the predefined area is determined according to application scenarios.

Figure 7:
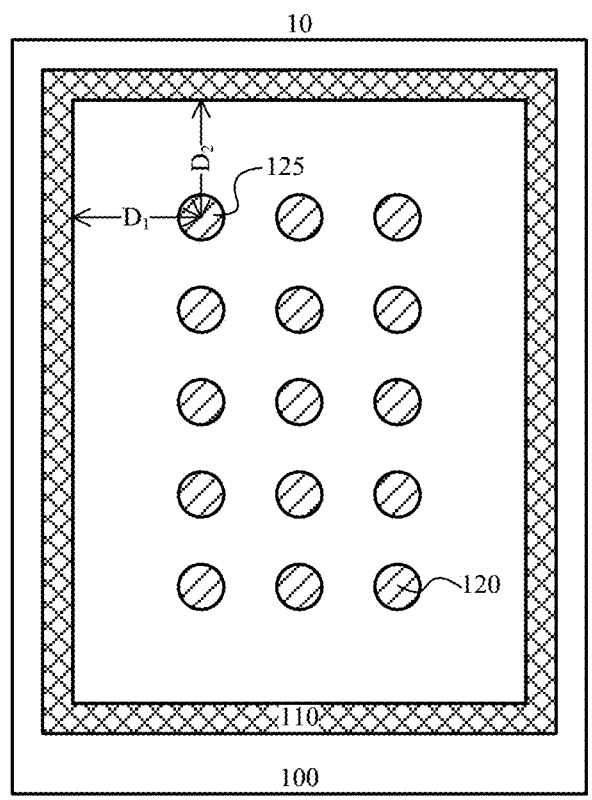
FIG. 7 is a schematic view for illustrating a liquid crystal pattern in an embodiment of the present disclosure.

The principle for correcting Not Fill in an embodiment of the present disclosure will be described hereinafter with reference to FIG. 7. FIG. 7 schematically illustrates a liquid crystal pattern in an embodiment of the present disclosure, which corresponds to the cross-sectional view shown in FIG. 2A. As shown, during liquid crystal injection process, the liquid crystal injection device 300 injects liquid crystal in the display region 102 of the first substrate 100, so as to form a liquid crystal pattern comprising liquid crystal droplets 120 which are arranged in a matrix.

For example, a liquid crystal droplet 125 in the liquid crystal pattern which is closest to an upper left corner of the frame sealant 110 has distances of $D_1$, $D_2$ with respect to two sides of the corner, respectively. In case a parameter like liquid crystal diffusion time is kept constant, the diffusion distance of liquid crystal is kept constant. In case the distance $\sqrt{D_1^2+D_2^2}$ between the liquid crystal droplet 125 and the upper left corner is larger than the above mentioned diffusion distance, the upper left corner will not be filled by liquid crystal. The distance $\sqrt{D_1^2+D_2^2}$ between the liquid crystal droplet 125 and the upper left corner is decreased, so that the diffused liquid crystal is close to the upper left corner as much as possible. In case $\sqrt{D_1^2+D_2^2}$ equals to the diffusion distance of liquid crystal, the liquid crystal is finally diffused to the upper left corner of the frame sealant 110.

It will be appreciated by the person with ordinary skill in the art that, by decreasing one or both of the distances $D_1$, $D_2$, it is possible to decrease the distance $\sqrt{D_1^2+D_2^2}$ between the liquid crystal droplet 125 and the corner of the frame sealant 110.

In an alternative embodiment, the distance between the liquid crystal droplet 125 and the corner of the display region 102 (as shown in FIG. 2A) is adjusted, so that the diffused liquid crystal at least reaches the corner of the display region 102. This kind of liquid crystal diffusion does not lead to the phenomenon of Not Fill, and thus is acceptable.

Figure 8:
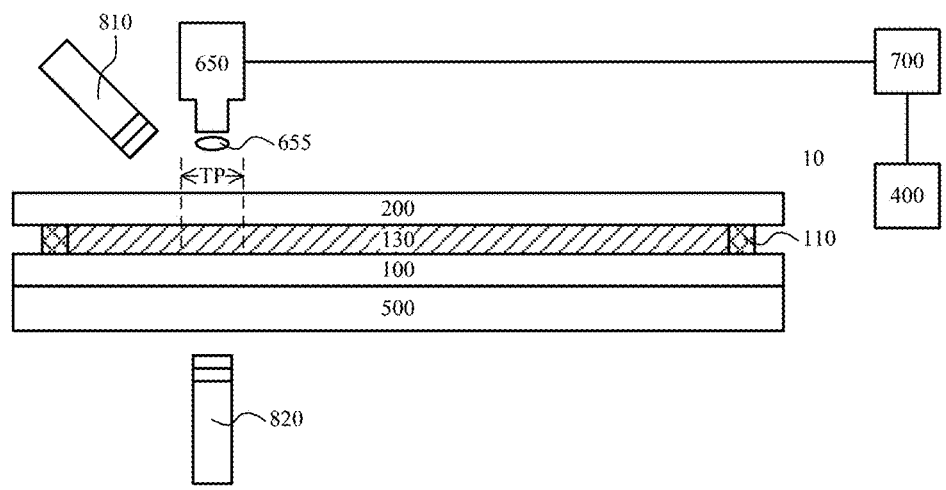
FIG. 8 is a schematic view for illustrating an apparatus for detecting liquid crystal diffusion in an embodiment of the present disclosure.

FIG. 8 schematically illustrates an apparatus for detecting liquid crystal diffusion in an embodiment of the present disclosure. The embodiment shown in FIG. 8 differs from the embodiment shown in FIG. 4 in that, an image acquisition device 650 comprises a rotatable polarizing component 655. The polarizing component 655 is rotated, and the image acquisition device 650 is used to provide an image about liquid crystal puncture. For example, the polarizing component 655 is a polarizer plate. In an example, the polarizing component 655 is detachably connected with the image acquisition device 650. Namely, in case the polarizing component 655 is not connected with the image acquisition device 650, the apparatus for detecting liquid crystal diffusion shown in FIG. 8 has a same function as the apparatus shown in FIG. 4.

Figure 9:
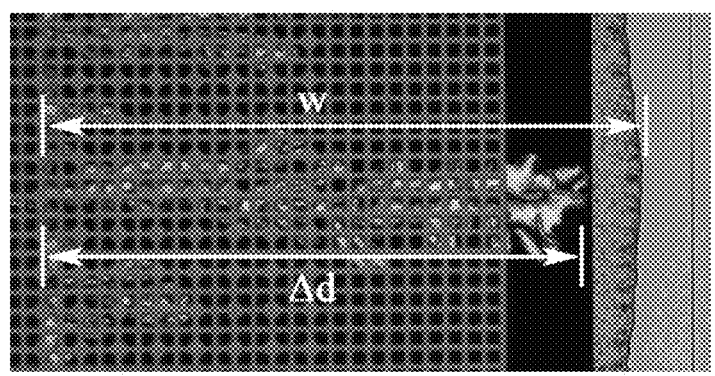
FIG. 9 is an image of a liquid crystal panel acquired by an image acquisition device in an embodiment of the present disclosure.

The image processing device 700 analyzes the image acquired by the image acquisition device 650 to determine a puncture distance of liquid crystal. FIG. 9 schematically illustrates a micrograph of the liquid crystal panel 10 acquired by the image acquisition device 650. The micrograph is an image of the liquid crystal panel 10 which is acquired by the image acquisition device 650 at the image acquiring region 22 shown in FIGS. 5B and 5C. The regular grids which are perpendicular to each other in the micrograph correspond to wirings in the liquid crystal panel 10. The frame sealant 110 has a width w. The liquid crystal intrudes into the frame sealant 110 from left to right. The puncture distance of liquid crystal is defined herein as a distance by which the liquid crystal has diffused beyond an inner side of the coated the frame sealant 110, i.e., Δd as shown.

In case the puncture distance Δd is larger than a predefined distance, the injection control device 400 decrease the liquid crystal diffusion time T to decrease the puncture distance. For example, a puncture distance of liquid crystal is determined by comparing different regions of an image which is acquired in a same image acquiring region, or by comparing a same region of multiple images acquired in different image acquiring regions. For example, the predefined distance is ⅓ or ½ of the width w of the frame sealant 110, and is determined according to application scenarios. In case the determined puncture distance is larger than the predefined distance, it is determined that the phenomenon of liquid crystal puncture occurs.

The principle for correcting liquid crystal puncture in an embodiment of the present disclosure will be described hereinafter.

During the process for fabricating a liquid crystal panel, the diffusion of liquid crystal process primarily comprises 3 stages.

The first stage refers to a stage from the moment the liquid crystal has just been dropped onto the first substrate to the start of the assembling process. In this stage, the liquid crystal diffuses in an open environment, and diffuses on the first substrate 100 primarily by virtue of the gravity of liquid crystal itself. The liquid crystal droplets 120 on the first substrate 100 gradually decrease their heights and increase their surface areas. In this stage, liquid crystal diffusion follows a fluid diffusion model.

The second stage refers to the assembling process. In this stage, liquid crystal is squeezed in the vacuum state by the first substrate 100 and the second substrate 200, and quickly diffuses to most regions of the liquid crystal panel 10. The liquid crystal possibly has not diffused to the sides and corners of the liquid crystal panel 10. In this stage, liquid crystal diffusion follows a vacuum diffusion model.

The third stage refers to diffusion of liquid crystal after the assembling process. Diffusion of liquid crystal between the first substrate 100 and the second substrate 200 primarily relies on surface tension of liquid crystal itself, and gradually diffuses to each corner of the space enclosed by the frame sealant. In this stage, liquid crystal diffusion follows a parallel plate diffusion model.

It is verified by practical production that the third stage is a stage which primarily affects liquid crystal puncture. Namely, liquid crystal diffusion time T is expressed as $T=T_1+T_2$, wherein $T_1$ is a duration of staying in vacuum state after the assembling process, and $T_2$ is a duration from the end of the vacuum state to the start of frame sealant curing.

According to the law of viscosity for fluid and the Washburn model for fluid flow, in the parallel plate diffusion model, the location d of liquid crystal at time T is expressed as:

$$T=T_1+T_2=3\mu d/\sigma b \cos \varphi,$$

wherein $\mu$ is a viscosity coefficient of liquid crystal, $\sigma$ is a surface tension coefficient of liquid crystal, b is a distance between two substrates of the liquid crystal panel, and $\varphi$ is a wetting angle of liquid crystal.

Based on the above equation, in case the image processing device 700 determines a puncture distance of liquid crystal $\Delta d$, it is possible to eliminate the liquid crystal puncture by decreasing the liquid crystal diffusion time T by $\Delta T=3\mu(\Delta d)/\sigma b \cos \varphi$.

By taking an Advanced Super Dimension Switch (ADS) product in which PI 6514 and LC F013 are adopted as an example, Table 1 shows values of parameters which affect the liquid crystal diffusion time $T=T_1+T_2$.

|  | b/μm | μ/(mPa·s) | σ/(N/m) | φ/° | T = $T_1$ + $T_2$/s |
|---|---|---|---|---|---|
| common range | 3.0-4.5 | 5-100 | 0.03-0.3 | 10-80 | / |
| 5.5 qHD | 3.35 | 81/25° C. | 0.1 | 45 | 10 + 50 |

It will be appreciated by the person with ordinary skill in the art that, by decreasing one or both of $T_1$, $T_2$, it is possible to decrease the liquid crystal diffusion time $T=T_1+T_2$, thus to decrease or eliminate liquid crystal puncture.

As shown in FIG. 8, the apparatus for detecting liquid crystal diffusion further comprises a first light source 810. The first light source 810 is arranged at a same side of the liquid crystal panel 10 as the image acquisition device 650, and provides oblique illumination in image acquiring regions TP for the image acquisition device 650. The apparatus for detecting liquid crystal diffusion further comprises a second light source 820. The second light source 820 is arranged at a side of the liquid crystal panel 10 opposite to the image acquisition device 650, and provides back illumination in image acquiring regions TP for the image acquisition device 650. The first light source 810 and the second light source 820 provide appropriate lighting for detecting Not Fill and/or liquid crystal puncture.

Figure 10:
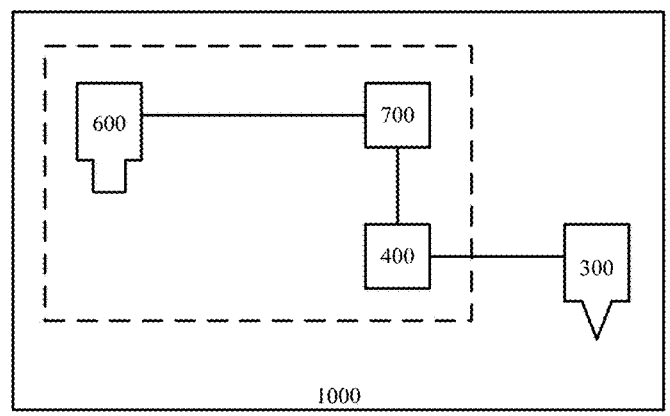
FIG. 10 is a schematic view for illustrating an apparatus for fabricating a liquid crystal panel in an embodiment of the present disclosure.

FIG. 10 schematically illustrates an apparatus for fabricating a liquid crystal panel in an embodiment of the present disclosure. As shown, the apparatus for fabricating a liquid crystal pane 11000 comprises the liquid crystal injection device 300 and the above described apparatus for detecting liquid crystal diffusion. For example, the apparatus for detecting liquid crystal diffusion comprises the image acquisition device 600, the image processing device 700 and the injection control device 400, as shown in FIG. 4. For example, the apparatus for detecting liquid crystal diffusion comprises the image acquisition device 650 with is provided with the polarizing component 655, the image processing device 700 and the injection control device 400, as shown in FIG. 8. As noted above, in an exemplary embodiment, the apparatus for detecting liquid crystal diffusion further comprises the first light source 810 and the second light source 820 for providing auxiliary lighting.

Figure 11:
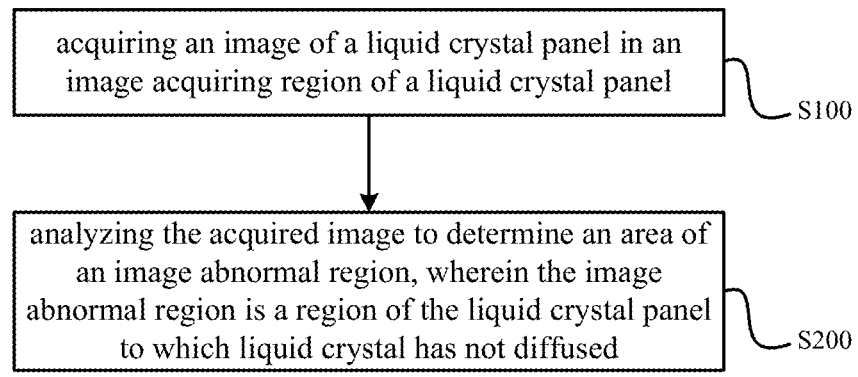
FIG. 11 is a flow chart for illustrating a method for detecting liquid crystal diffusion in an embodiment of the present disclosure.

FIG. 11 schematically illustrates a method for detecting liquid crystal diffusion in an embodiment of the present disclosure.

As shown, the method comprises: S100, acquiring an image of a liquid crystal panel in an image acquiring region of a liquid crystal panel; and S200, analyzing the acquired image to determine an area of an image abnormal region, wherein the image abnormal region is a region of the liquid crystal panel to which liquid crystal has not diffused.

The method further comprises: S300, as a response to the area of the image abnormal region being larger than a predefined area, adjusting a liquid crystal injection device to decrease the area of the image abnormal region, e.g., adjusting the liquid crystal injection device to decrease a distance between a liquid crystal injection point which is closest to a corner of a frame sealant and one or two sides of the corner.

In an exemplary embodiment, the method further comprises: S400, acquiring an image of a liquid crystal panel in the image acquiring region of the liquid crystal panel by means of a polarizing component; S500, analyzing the acquired image to determine a puncture distance of liquid crystal; and S600, as a response to the puncture distance being larger than a predefined distance, decreasing a liquid crystal diffusion time T to decrease the puncture distance. For example, step S600 comprises: decreasing the liquid crystal diffusion time $T=T_1+T_2$, wherein $T_1$ is a duration of staying in vacuum state after an assembling process, and wherein $T_2$ is a duration from an end of the vacuum state to the start of frame sealant curing. For example, step S600 comprises: decreasing the liquid crystal diffusion time T by $\Delta T=3\mu(\Delta d)/\sigma b \cos \varphi$, wherein $\mu$ is a viscosity coefficient of liquid crystal, $\Delta d$ is the puncture distance of liquid crystal, $\sigma$ is a surface tension coefficient of liquid crystal, b is a distance between two substrates of the liquid crystal panel, and $\varphi$ is a wetting angle of liquid crystal.

An exemplary method for detecting Not Fill will be described hereinafter. The image acquiring regions on the liquid crystal panel which has been subject to the assembling process are determined. Images of the liquid crystal panel are acquired at the image acquiring region. It is judged whether the grayscale value at the image acquiring region is satisfactory. In case the grayscale value is not satisfactory, the first light source and the second light source are adjusted to provide a satisfactory grayscale value at the image acquiring region. In case the grayscale value at the image acquiring region is satisfactory, the acquired images are analyzed to determine the area of the image abnormal region. In case the area of the image abnormal region is smaller than e.g., 5 pixels, it is determined that Not Fill does not occur in the liquid crystal panel. In case the area of the image abnormal region is larger than e.g., 5 pixels, the liquid crystal injection device is adjusted to decrease the area of the image abnormal region.

An exemplary method for detecting liquid crystal puncture will be described hereinafter. The image acquiring regions on the liquid crystal panel which has been subject to the assembling process are determined. Images of the liquid crystal panel are acquired at the image acquiring region by means of a polarizing component. It is judged whether the grayscale value at the image acquiring region is satisfactory. In case the grayscale value is not satisfactory, the first light source and the second light source are adjusted to provide a satisfactory grayscale value at the image acquiring region. In case the grayscale value at the image acquiring region is satisfactory, the acquired images are analyzed to determine the puncture distance of liquid crystal. In case the puncture distance is smaller than e.g., ⅓ of the width w of the frame sealant, it is determined that liquid crystal puncture does not occur in the liquid crystal panel. In case the puncture distance is larger than e.g., ⅓ of the width w of the frame sealant, the liquid crystal diffusion time T is decreased to decrease the puncture distance. It is noted that the features which have been described above with reference to embodiments of the apparatus for detecting liquid crystal diffusion are also applicable to the method for detecting liquid crystal diffusion. The accompanying drawing and the above mentioned implementations only illustrate or describe components or elements relevant with technical solutions of embodiments of the present disclosure, while components or elements irrelevant with these technical solutions are omitted. The liquid crystal panel 10 shown in FIG. 3 may further comprise other components, e.g., spacers between the first substrate 100 and the second substrate 200. The apparatus for detecting liquid crystal diffusion shown in FIG. 4 and FIG. 8 may further comprise other devices, e.g., devices for driving the image acquisition device 600, 650. It is further noted that apart from the liquid crystal drop (ODF) process, technical solutions in embodiments of the present disclosure are also applicable to other method for filling liquid crystal, e.g., inkjet.

It is disclosed an apparatus for detecting liquid crystal diffusion, comprising an image acquisition device and an image processing device. The image acquisition device acquires an image of a liquid crystal panel in an image acquiring region of the liquid crystal panel. The image processing device analyzes the acquired image to determine an area of an image abnormal region, and the image abnormal region is a region of the liquid crystal panel to which liquid crystal has not diffused. In the apparatus for detecting liquid crystal diffusion, after curing of a frame sealant, defects about liquid crystal diffusion in the liquid crystal panel are detected, and the detected results are feedback to adjust parameters for injecting and diffusing liquid crystal for eliminating these defects. These defects about liquid crystal diffusion comprise Not Fill and/or liquid crystal puncture, which potentially lead to defects like peripheral Mura and Line Zara. It is further disclosed an apparatus for fabricating a liquid crystal panel comprising the above apparatus for detecting liquid crystal diffusion, as well as a method for detecting liquid crystal diffusion.

It is noted that features in embodiments can be combined in any manner on condition that no conflict is involved. It will be appreciated by the person with ordinary skill in the art that all or some procedures of the method can be implemented by computer program instructions related hardware, the computer program is stored in a computer-readable storage medium, and when executed, the computer program performs the procedures of the method as described above. The computer-readable storage medium is e.g., a magnetic disk, an optical disc, a read-only memory (ROM), or a random access memory (RAM).

Apparently, the person with ordinary skill in the art can make various modifications and variations to the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. An apparatus for detecting liquid crystal diffusion, comprising:
   an image acquisition device, which is configured to acquire an image of a liquid crystal panel in an image acquiring region of the liquid crystal panel; and
   an image processing device, which is configured to analyze the acquired image to determine an area of an image abnormal region, wherein the image abnormal region is a region of the liquid crystal panel to which liquid crystal has not diffused.

2. The apparatus of claim 1, further comprising an injection control device, which is configured to, as a response to the area of the image abnormal region being larger than a predefined area, adjust a liquid crystal injection device to decrease the area of the image abnormal region.

3. The apparatus of claim 1, wherein the image acquiring region is arranged to surround a display region of the liquid crystal panel, and the image acquiring region comprises at least a corner of the display region.

4. The apparatus of claim 3, wherein the image acquiring region comprises a middle point of at least a side of the display region.

5. The apparatus of claim 4, wherein the image acquisition device comprises one or more groups of moveable scanning lenses, and each moveable scanning lens in each group corresponds to each image acquiring region, respectively.

6. The apparatus of claim 1, wherein the area of the image abnormal region is an area of a grayscale abnormal region.

7. The apparatus of claim 6, wherein the predefined area is an area of 5 pixel units of the liquid crystal panel.

8. The apparatus of claim 1, wherein the injection control device is configured to adjust the liquid crystal injection device to decrease a distance between a liquid crystal injection point which is closest to a corner of a frame sealant and one or two sides of the corner.

9. The apparatus of claim 1, wherein the image acquisition device is further provided with a rotatable polarizing component which is configured to analyze the acquired image to determine a puncture distance of liquid crystal.

10. The apparatus of claim 9, wherein the injection control device is configured to, as a response to the puncture distance being larger than a predefined distance, decrease a liquid crystal diffusion time T to decrease the puncture distance.

11. The apparatus of claim 10, wherein the predefined distance is ⅓ of a width of a frame sealant.

12. The apparatus of claim 10, wherein the injection control device is further configured to, as a response to the puncture distance being larger than the predefined distance, decrease the liquid crystal diffusion time $T=T_1+T_2$, wherein $T_1$ is a duration of staying in vacuum state after an assembling process, and wherein $T_2$ is a duration from an end of the vacuum state to the start of frame sealant curing.

13. The apparatus of claim 12, wherein the injection control device is configured to decrease the liquid crystal diffusion time T by $\Delta T=3\mu(\Delta d)/\sigma b \cos \varphi$, wherein $\mu$ is a viscosity coefficient of liquid crystal, $\Delta d$ is the puncture distance of liquid crystal, $\sigma$ is a surface tension coefficient of liquid crystal, b is a distance between two substrates of the liquid crystal panel, and $\varphi$ is a wetting angle of liquid crystal.

14. The apparatus of claim 1, further comprising:

a first light source, which is arranged at a same side of the liquid crystal panel as the image acquisition device, and configured to provide oblique illumination for the image acquisition device in the image acquiring region; and a second light source, which is arranged at a side of the liquid crystal panel opposite to the image acquisition device, and configured to provide back illumination for the image acquisition device in the image acquiring region.

15. An apparatus for fabricating a liquid crystal panel, comprising a liquid crystal injection device and the apparatus for detecting liquid crystal diffusion of claim 1.

16. A method for detecting liquid crystal diffusion, comprising:

acquiring an image of a liquid crystal panel in an image acquiring region of the liquid crystal panel; and analyzing the acquired image to determine an area of an image abnormal region, wherein the image abnormal region is a region of the liquid crystal panel to which liquid crystal has not diffused.

17. The method of claim 16, further comprising:

adjusting a liquid crystal injection device to decrease a distance between a liquid crystal injection point which is closest to a corner of a frame sealant and one or two sides of the corner, as a response to the area of an image abnormal region larger than a predefined area.

18. The method of claim 16, further comprising:

acquiring an image of a liquid crystal panel in the image acquiring region of the liquid crystal panel by means of a polarizing component;

analyzing the acquired image to determine a puncture distance of liquid crystal; and decreasing a liquid crystal diffusion time T to decrease the puncture distance, as a response to the puncture distance being larger than a predefined distance.

19. The method of claim 18, wherein decreasing the liquid crystal diffusion time T to decrease the puncture distance comprises: decreasing the liquid crystal diffusion time $T=T_1+T_2$, wherein $T_1$ is a duration of staying in vacuum state after an assembling process, and wherein $T_2$ is a duration from an end of the vacuum state to the start of frame sealant curing.

20. The method of claim 19, wherein decreasing the liquid crystal diffusion time T to decrease the puncture distance comprises: decreasing the liquid crystal diffusion time T by $\Delta T=3\mu(\Delta d)/\sigma b \cos \varphi$, wherein $\mu$ is a viscosity coefficient of liquid crystal, $\Delta d$ is the puncture distance of liquid crystal, $\sigma$ is a surface tension coefficient of liquid crystal, b is a distance between two substrates of the liquid crystal panel, and $\varphi$ is a wetting angle of liquid crystal.

* * * * *